(12) United States Patent
Mei et al.

(10) Patent No.: US 12,304,995 B2
(45) Date of Patent: May 20, 2025

(54) ELECTROCHROMIC POLYMERS WITH HIGH OPTICAL CONTRASTS

(71) Applicant: AMBILIGHT INC., Grand Cayman (KY)

(72) Inventors: Jianguo Mei, West Lafayette, IN (US); Liyan You, West Lafayette, IN (US); Kuluni Perera, West Lafayette, IN (US); Wenting Wu, Lafayette, IN (US)

(73) Assignee: AMBILIGHT INC., Grand Cayman (KY)

( * ) Notice: Subject to any disclaimer, the term of this patent is extended or adjusted under 35 U.S.C. 154(b) by 455 days.

(21) Appl. No.: 17/702,495

(22) Filed: Mar. 23, 2022

(65) Prior Publication Data
US 2023/0303763 A1    Sep. 28, 2023

(51) Int. Cl.
 *C08G 61/12*  (2006.01)
 *C09K 9/02*  (2006.01)
(52) U.S. Cl.
 CPC .......... *C08G 61/126* (2013.01); *C09K 9/02* (2013.01); *C08G 2261/149* (2013.01); *C08G 2261/54* (2013.01)

(58) Field of Classification Search
 CPC ............ C08G 61/123; C08G 61/126; C08G 2261/149; C08G 2261/12; C08G 2261/228; C08G 2261/312; C08G 2261/314; C08G 2261/3246; C08G 2261/3243; C08G 2261/3241; C08G 2261/3242; C08G 2261/54; C09K 9/02; C09K 2211/1491; C09K 2211/1483; C09K 2211/1458; C09K 2211/1466; C09K 2211/145; C09K 2211/1425; C09K 2211/1416
 See application file for complete search history.

(56) References Cited

FOREIGN PATENT DOCUMENTS

WO    WO 2022235357    * 11/2022 ............. H01B 1/127

* cited by examiner

*Primary Examiner* — Shane Fang
(74) *Attorney, Agent, or Firm* — Dickinson Wright PLLC

(57) ABSTRACT

A new electrochromic polymer with high optical contrast and an electrochromic device incorporating the electrochromic polymer are presented. The electrochromic polymer includes side chains selected from $C_5$-$C_{20}$ linear or branched alkyl.

12 Claims, 12 Drawing Sheets

ELECTROCHROMIC POLYMERS WITH HIGH OPTICAL CONTRASTS

The present disclosure is generally related to a new electrochromic polymer with high optical contrast and an electrochromic device incorporating the electrochromic polymer.

BACKGROUND

Electrochromic devices (ECDs) has drawn a lot of interest due to its potential applications to improve functionality of homes and vehicles. Electrochromic polymers (ECPs) have risen to be promising electrochromic materials for commercial electrochromic devices. To meet the requirements for large-scale manufacturing of electrochromic films and devices, ECPs are expected to be solution-processible with high optical contrasts. To render the solution processability compatible with roll-to-roll manufacturing techniques, the common strategy is to elongate side chain length. However, it might have a risk of decreased optical contrast and phase separation. Meanwhile, conventional ECPs, typically cathodically-coloring polymers, suffer from tailing of polaron/bipolaron absorption bands into the visible region in bleached state. The resulting residual color in the bleached state gets worse when the film is thick, preventing the films from reaching high optical contrasts. However, approaches to minimize the impact of residual color, such as the use of thinner electrochromic layers, usually compromise the colored state absorptivity, therefore affecting the optical contrast. So how to engineer a solution-processible electrochromic polymer with high optical contrast to meet the requirements for large-scale manufacturing of electrochromic films and devices is yet to be explored.

SUMMARY

The present invention is related to a new electrochromic polymer with high optical contrast and an electrochromic device incorporating the electrochromic polymer.

In one aspect, the present disclosure is related to a new ECP comprising a formula of

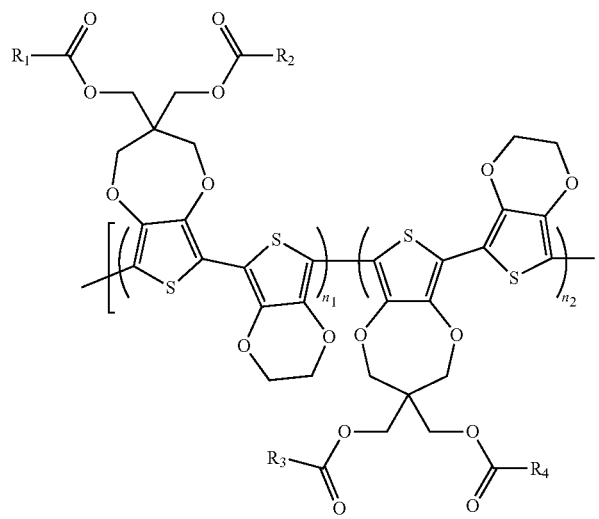 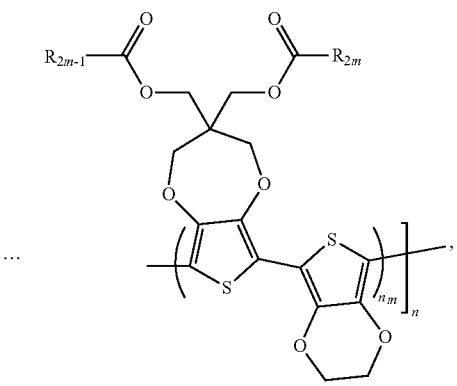

wherein n is an integer greater than 0; $n_1, n_2, \ldots, n_m$ are no less than 0, and the sum of $n_1, n_2, \ldots, n_m$ equals 1; each of $R_1, R_2, R_3, R_4, \ldots,$ and $R_{2m}$ is independently selected from independently selected from $C_5$-$C_{20}$ linear or branched alkyl. The polymer has a side chain density calculated by a total mass percentage of $R_1, R_2, R_3, R_4, \ldots,$ and $R_{2m}$ with respect to mass of the polymer The ECP in the present disclosure has the side chain density ranging from 35% to 60%. The maximum optical contrast of the disclosed ECP is dependent on the side chain density. In some embodiments, the maximum optical contrast of the electrochromic polymer increases with a reduced side chain density, and the maximum optical contract ranges from 60% to 95%.

The disclosed ECP has an absorption coefficient in a bleached state. The absorption coefficient in the bleached state is dependent on the side chain density. In some embodiments, the absorption coefficient in the bleached state decreases with a reduced side chain density of the electrochromic polymer. In some embodiments, the absorption coefficient in the bleached state of the polymer decreases within 35% when the side chain density decreases from 60% to 35%. In some embodiments, the absorption coefficient in the bleached state of the electrochromic polymer varies from $0.04 \times 10^5$ to $0.13 \times 10^5$ cm$^{-1}$.

The disclosed ECP has an absorption coefficient in a colored state. The absorption coefficient in the colored state is dependent on the side chain density. In some embodiments, the absorption coefficient in the colored state increases with a reduced side chain density of the electrochromic polymer. In some embodiments, the absorption coefficient in the colored state of the polymer varies from about $0.7 \times 10^5$ cm$^{-1}$ to $1.8 \times 10^5$ cm$^{-1}$.

In some embodiments, the disclosed ECP comprises a formula of:
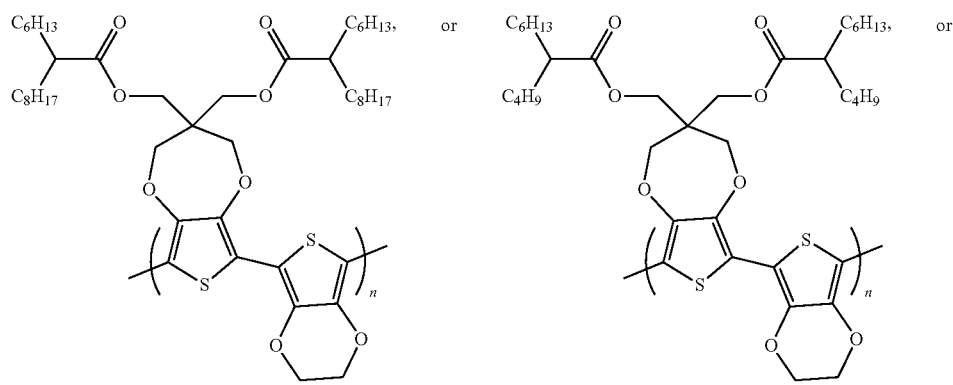
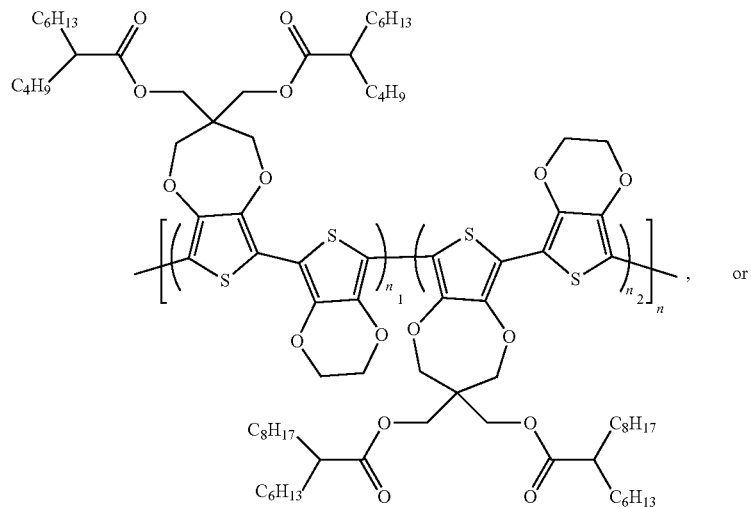
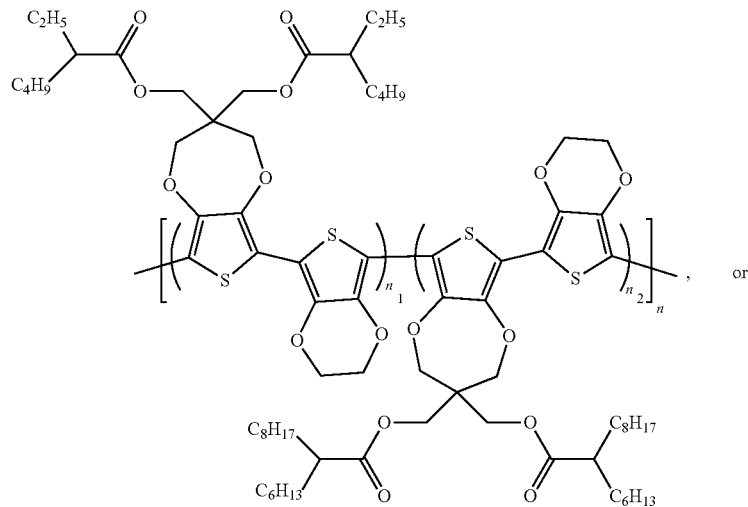

-continued

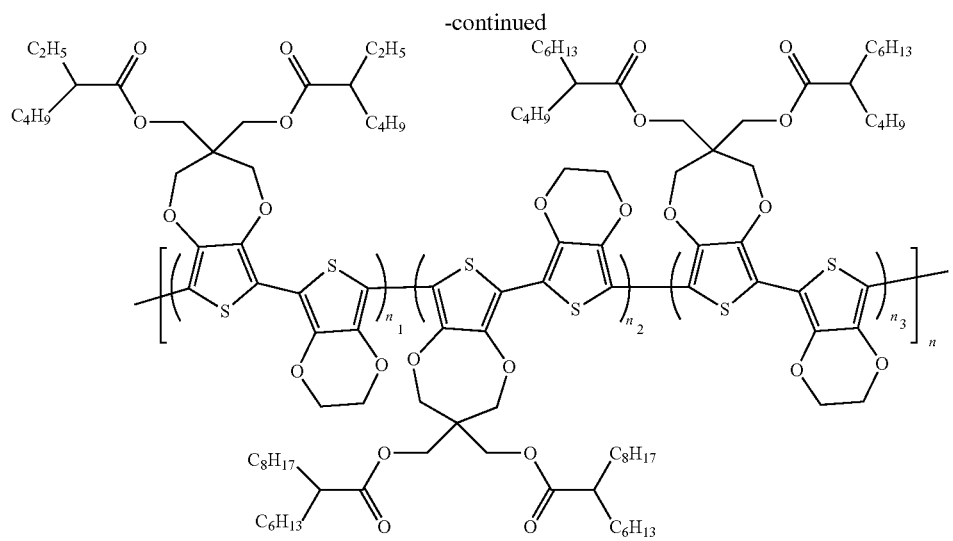

In another aspect, the present disclosure is also related to an electrochromic device incorporating the disclosed ECPs.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below. For the purpose of illustrating the invention, the drawings show aspects of one or more embodiments of the invention. However, it should be understood that the present invention is not limited to the precise arrangements and instrumentalities shown in the drawings.

FIG. 2(A) is for $P_{(6,8)}$. FIG. 2(B) is for $P_{(6,8)-(4,6)}$. FIG. 2(C) is for $P_{(6,8)-(2,4)}$. FIG. 2(D) is for $P_{(6,8)-(4,6)-(2,4)}$. FIG. 2(E) is for $P_{(4,6)}$.

FIG. 5(A) is for the example polymer solutions in $CHCl_3$. FIG. 5(B) is for an exemplary embodiment, $P_{(4,6)}$ solutions at different concentrations.

FIG. 7(A) is for colored state. FIG. 7(B) is for bleached state.

FIGS. 9 (A)-(F) are the effects of thinner film on bleached state transmittance and switching kinetics.

DETAILED DESCRIPTION OF EMBODIMENTS

Figure 1A:
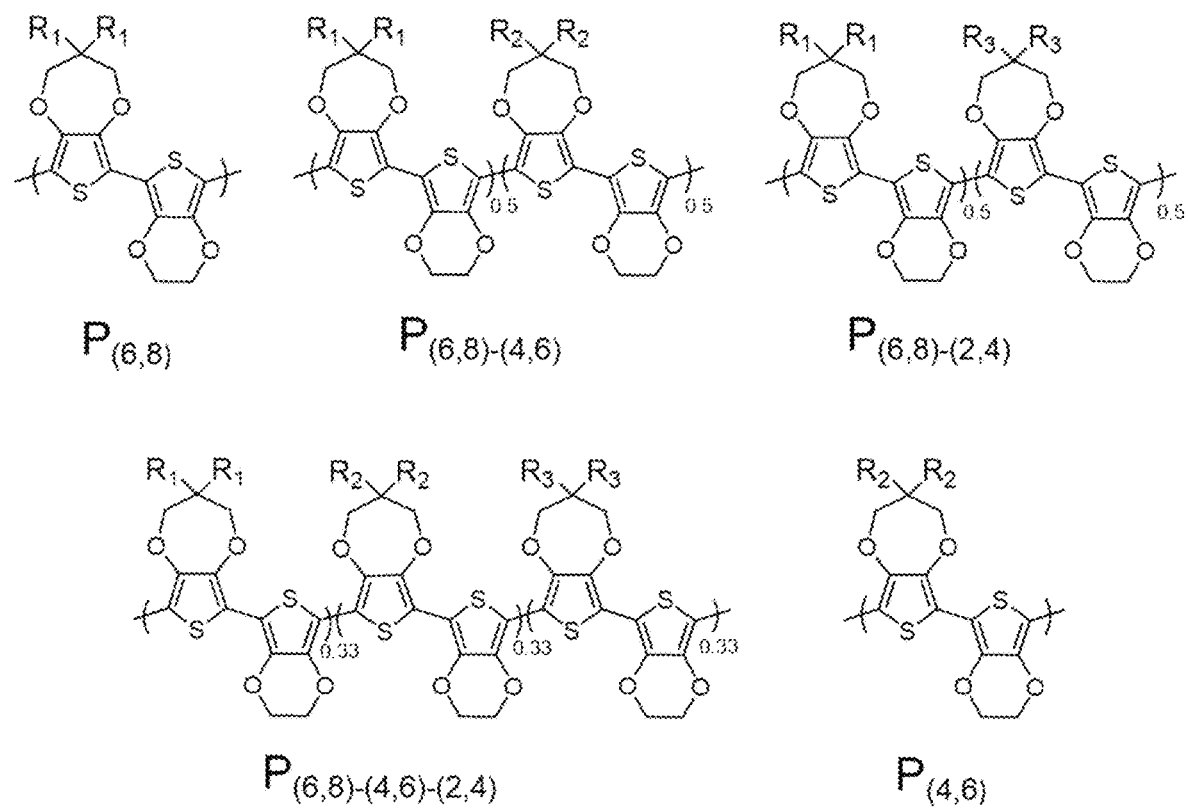
FIG. 1(A) shows the structures of the example disclosed electrochromic polymers according to the embodiments of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it was individually recited herein. Additionally, the singular forms "a" "an", and "the" include plural referents unless the context clearly dictates otherwise.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The present disclosure is related to a new ECP comprising at least one copolymer block with an ester side-chain substituted propylenedioxythiophene repeating unit alternating with an ethylene dioxythiophene (EDOT) repeating unit with a formula of:

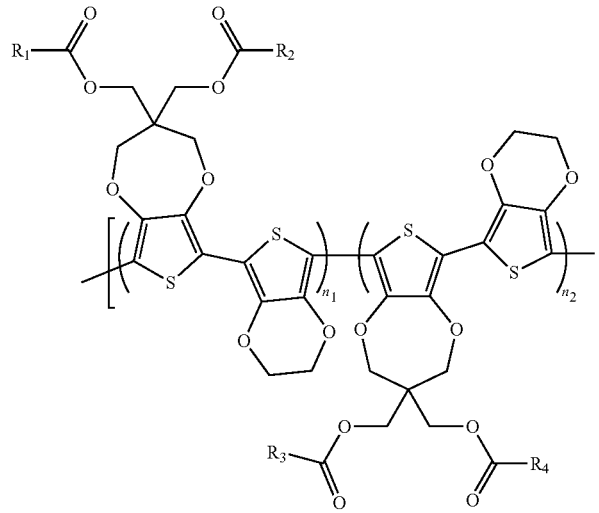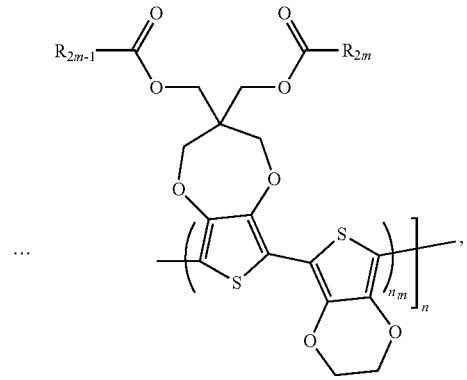

wherein n is an integer greater than 0; $n_1, n_2, \ldots, n_m$ are no less than 0, and the sum of $n_1, n_2, \ldots, n_m$ equals 1; each of $R_1, R_2, R_3, R_4, \ldots$, and $R_{2m}$ is independently selected from $C_5$-$C_{20}$ linear or branched alkyl. Two alkyl groups from the ester side chain on one propylenedioxythiophene can be the same or different and can be either linear or branched. For the branched alkyl groups, two branches can have the same or different side chain length.

In the structure above, ester side chain endows the good solubility to the disclosed polymer. When compared with the conventional solubility endowing ether group, the ester group introduces quite a few benefits. The typical reactions to form the conventional ether groups require strong acid or base as the catalyst and often harsh reaction conditions, and typically have a very low reaction yield. However, the typical reactions to form the ester groups are the condensation reactions between alcohol and carboxylic acid, which only require mild conditions and make scale-up production feasible, and can also have a much higher synthesis yield (higher accordingly than 65% or higher than 75% or higher than 85% accordingly to some embodiments) and a much better scale-up production capacity (higher than 200 g, or higher than 1 kg or higher than 10 kg according to some embodiments).

Furthermore, the ester side chain provides stronger interaction with the substrate, thus enhances the thin film coating process. In addition, the ester functional group promotes the ion diffusion in and out of ECP thin film during oxidation/reduction reaction, which further improves the optical contrast.

The disclosed polymer has a side chain density calculated by a total mass percentage of $R_1, R_2, R_3, R_4, \ldots$, and $R_{2m}$ with respect to mass of the polymer. The side chain density ranges from 35% to 60%. The absorption coefficients in both a bleached state and a colored state and the maximum optical contracts are found to be dependent on the side chain density of the disclosed polymer. The lower side chain density, the higher absorption coefficient in the colored state is, while the lower or not much change the absorption coefficient in the bleached state is, thus the higher maximum optical contrast of the disclosed polymer is. The maximum optical contrast of the disclosed ECP ranges from 60% to 95%.

This interesting finding demonstrates that the side chain engineering is an effective strategy to tune the absorption coefficients of polymer films in both colored and bleached states so as to improve the optical contrast, without compromising solution processability. For conventional ECPs, to minimize the influence of residual absorption in the bleached state for higher optical contrasts, we need to keep the film thickness low, while simultaneously maintaining high absorptivity in the colored state. By decreasing the side chain density to reduce the volume fraction of the solubilizing groups, high chromophore density can be achieved, such that the absorption coefficient of thin films in the colored state is increased. Surprisingly, decreasing side chain density decreases or has minimum influence on the absorptivity of the bleached state. The improved absorption properties allows thinner films to be used to reach high optical densities in the colored state. Since the reduced thickness helps to minimize effects of residual absorption in the bleached state in addition to the opposite or minimum influence of the absorptivity in the bleached state from the side chain density, higher optical contrast can be achieved. Also thinner film benefits faster switching time. Therefore, for polymers with lower side chain densities, thinner film with less residual color and faster switching time can still achieve high optical densities in the colored state to present higher optical contrasts. For polymers with the same average side chain densities, their maximum optical contrasts are almost the same. However, those with more diverse side chain lengths are favored for their ion dynamics, which benefit their enhanced electrochromic performance for commercial applications. These findings provide useful insights to the on-going efforts of enhancing the electrochromic performance of cathodically-coloring ECPs for commercial applications.

In some embodiments, the disclosed ECP comprises one copolymer block or two copolymer blocks or three copolymer blocks with the formulas of:

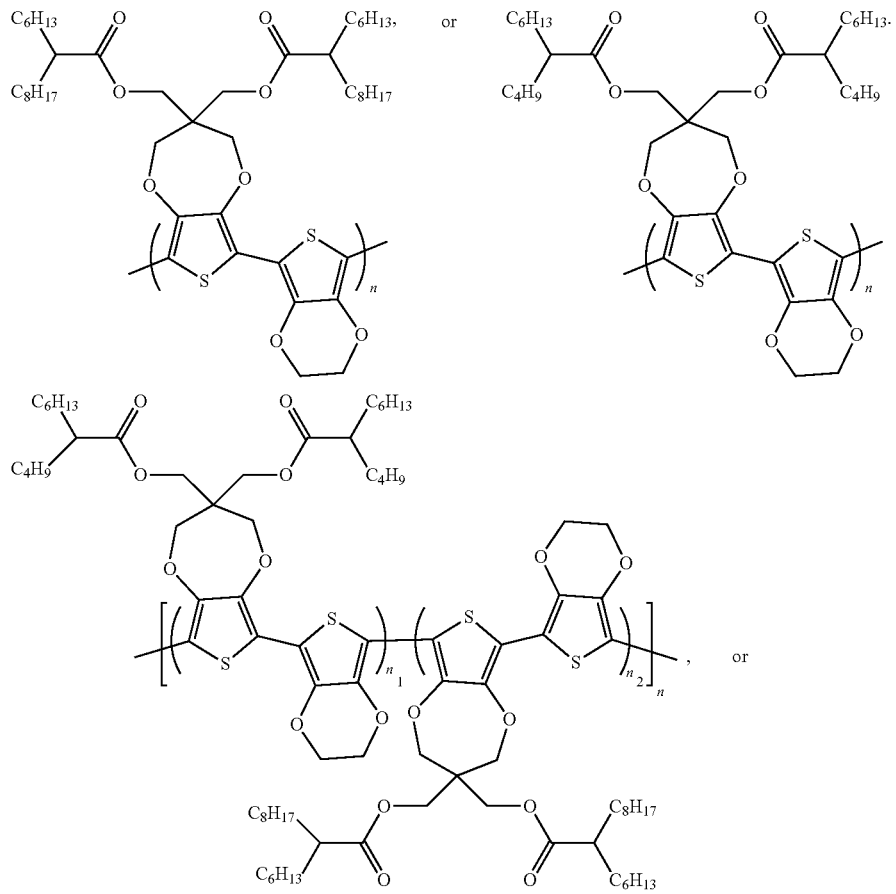

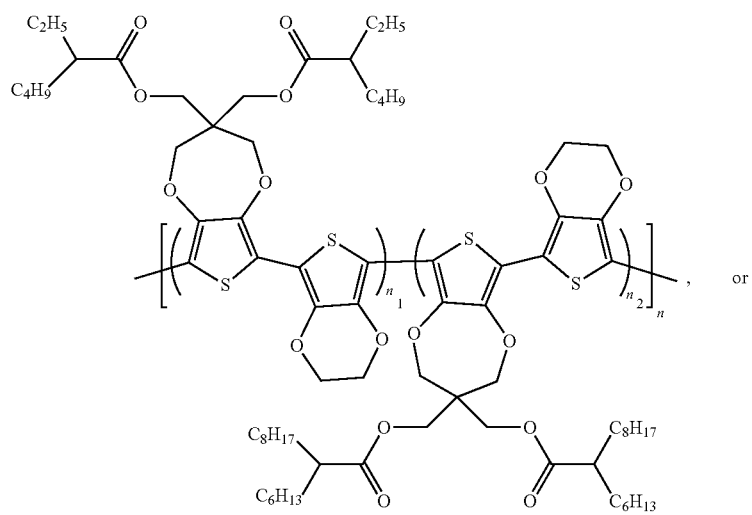

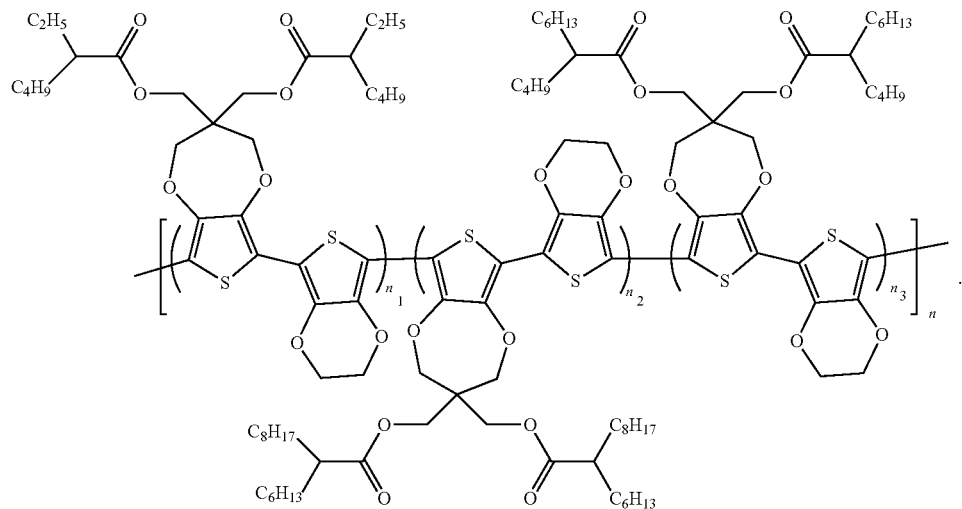

Figure 1B:
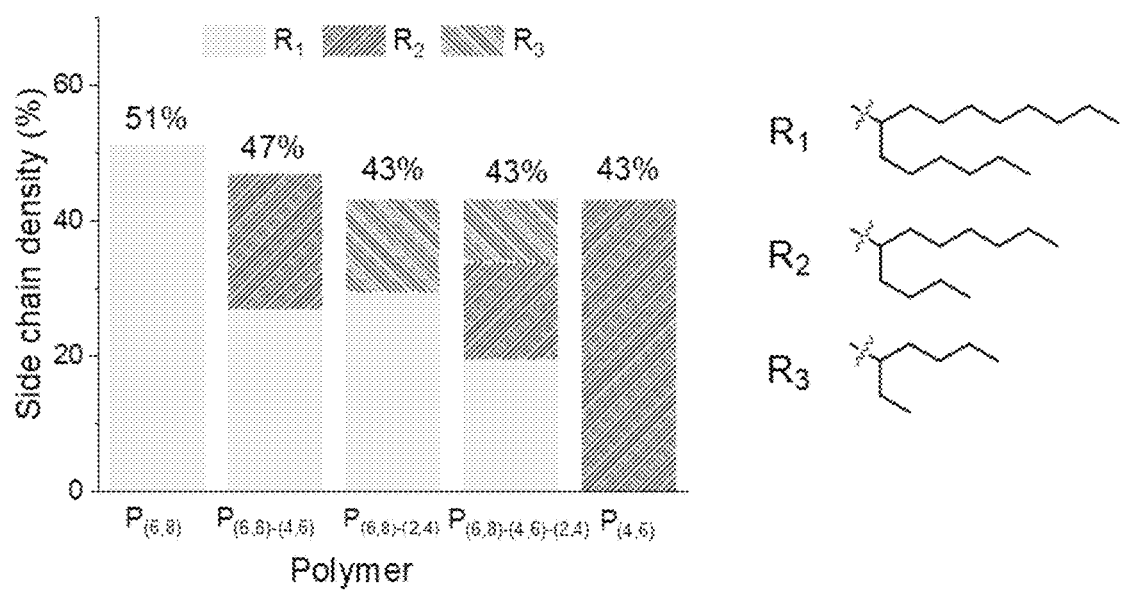
FIG. 1(B) shows the side chain densities of those polymers according to the embodiments of the invention.
Figure 2A:
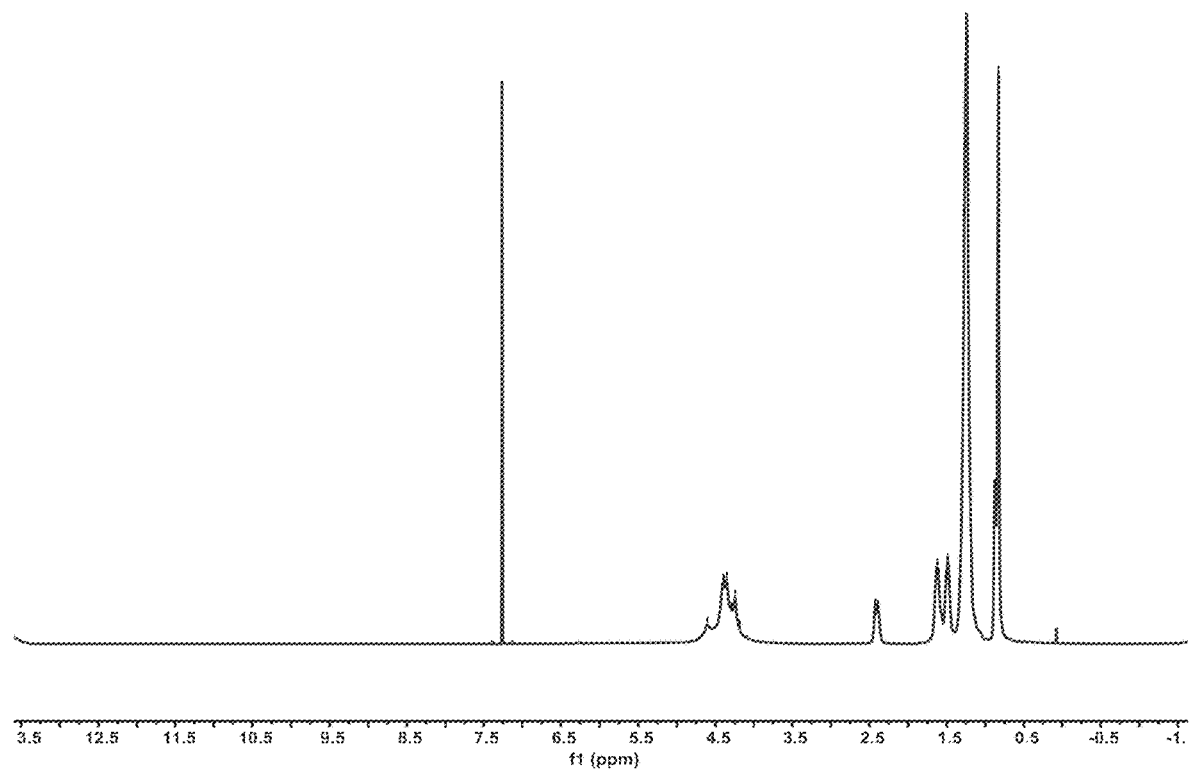
FIGS. 2(A)-(E) are the NMR spectra of the example disclosed electrochromic polymers according to the embodiments of the invention.
Figure 2B:
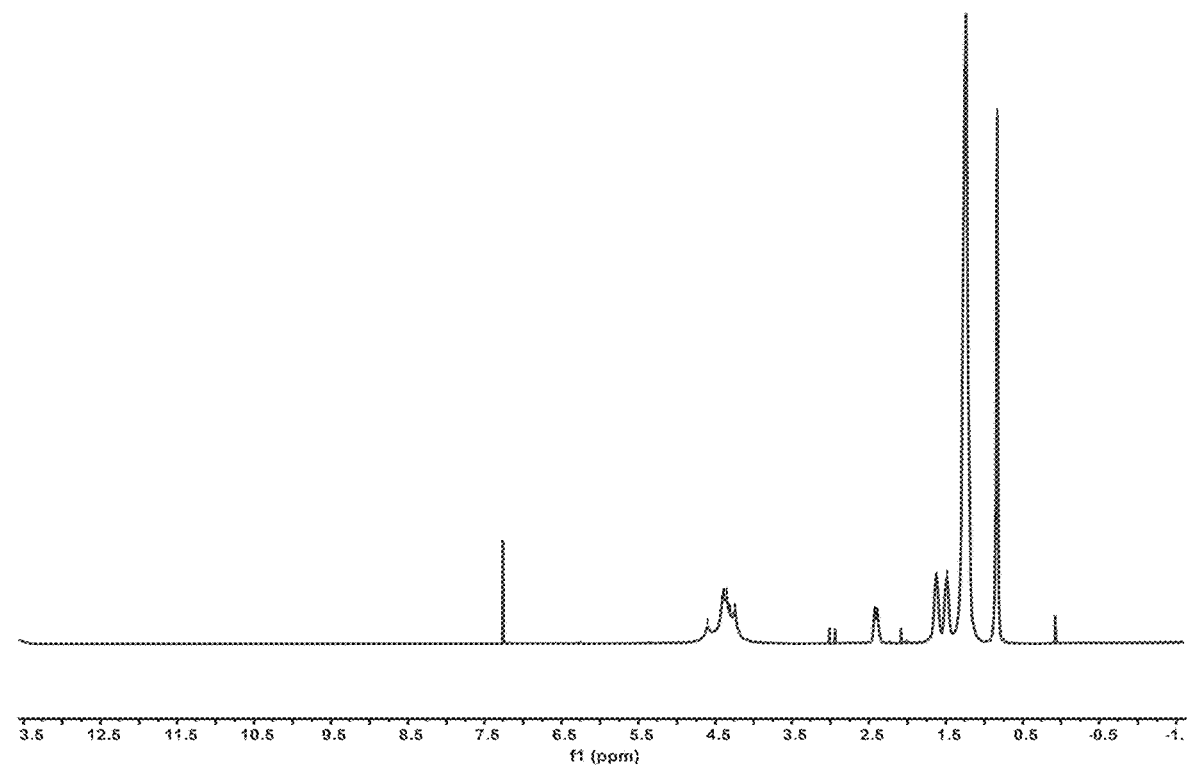
Figure 2C:
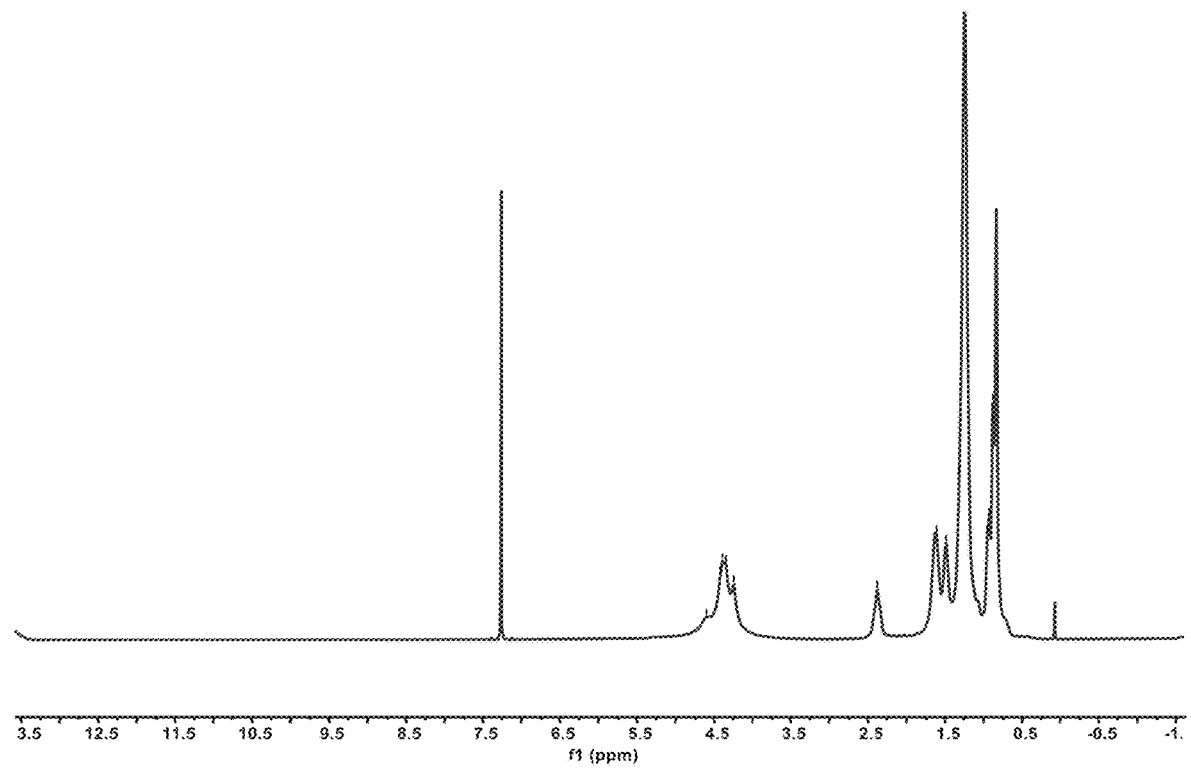
Figure 2D:
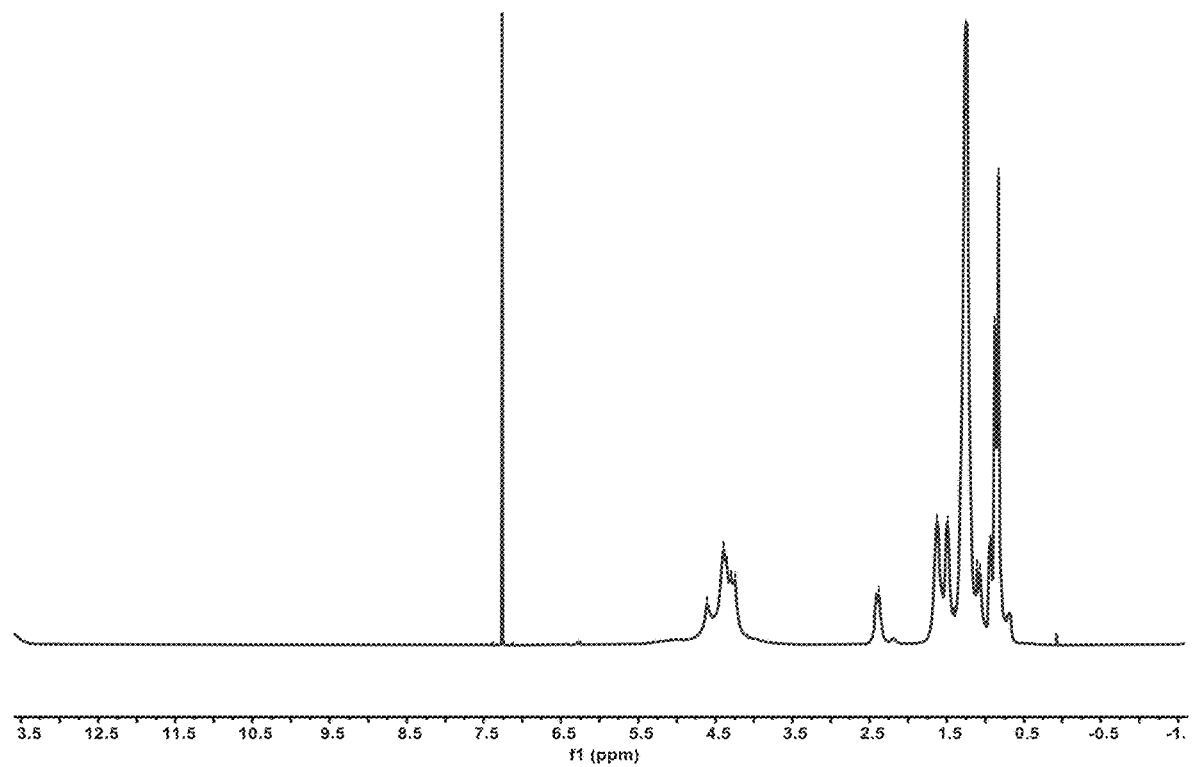
Figure 2E:
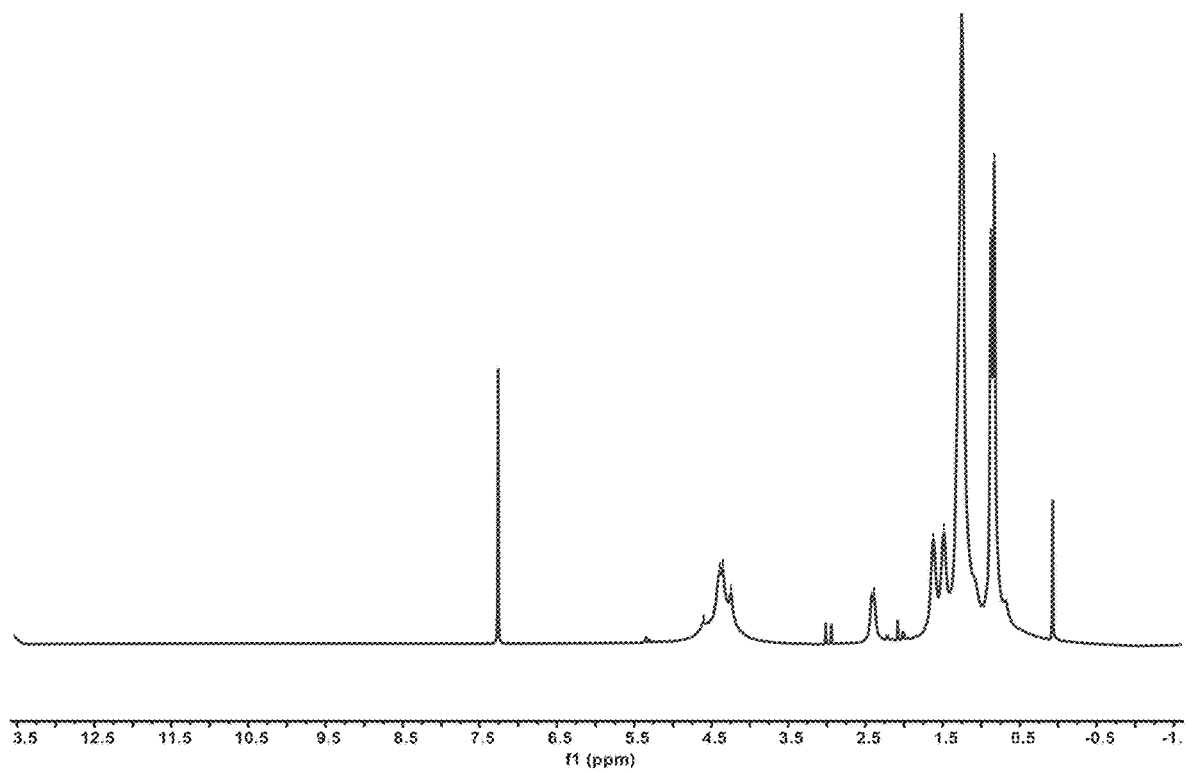

To illustrate this invention better, three different 1,2-dibromo-3,4-propylenedioxythiophene (ProDOT) monomers consisting of three different side chain lengths are used as examples in the following description (FIG. 1(A)). Those three side chains are either 2-hexyldecanoate ($C_6C_8$, $R_1$), 2-butyloctanoate ($C_4C_6$, $R_2$) or 2-ethylhexanoate ($C_2C_4$, $R_3$) as the solubilizing groups. Three different ProDOT monomers are first synthesized and then incorporated into the polymer chains in different ratios with unsubstituted EDOT monomers to form ProDOT-EDOT copolymers with varied side chain densities. As shown in FIG. 1(B), P(6,8) has the highest side chain density of 51% and the lowest side chain density is obtained for P(4,6) with one single ProDOT monomer, or P(6,8)-(2,4) with two combined ProDOT monomers, or P(6,8)-(4,6)-(2,4) with three combined ProDOT monomers. As the average chain lengths and substitution patterns are altered, the trends of absorption coefficients in colored and bleached states are compared. The influence of absorption coefficient modulation on electrochromic properties including optical contrast, switching time, and coloration efficiency are also compared. We confirm that side chain density reduction is an effective strategy to increase the absorption coefficient in the neutral state while retaining or even lowering the light absorbance below $0.1 \times 10^4$ cm$^{-1}$ over the visible region in the bleached state, thereby achieving optical contrasts of nearly 80% at $\lambda_{max}$ under optimized conditions.

All polymers are synthesized in high yields via palladium catalyzed direct C—H arylation polymerization (DArP). A detailed synthetic procedure is shown in scheme 1. ProDOT (6,8) (x eq.), ProDOT(4,6) (y eq.), ProDOT(2,4) (1-x-y eq.), EDOT (1.0 eq.), $K_2CO_3$ (2.6 eq.), PivOH (0.3 eq.) and $Pd(OAc)_2$ (0.02 eq.) are added to a Schlenk flask, kept under vacuum for about 15 min and purged with $N_2$ three times. Then, nitrogen degassed solvent Dimethylacetamide (1.0 g EDOT use 30 ml of solvent) is added to the flask and the flask is heated in an oil bath at 140° C. for 6 h under nitrogen. The hot reaction mixture is transferred to a 1:1 mixture of $CH_3OH$ and 1 M HCl while stirring. The resulting mixture is filtered to obtain a solid. This solid is dissolved in $CHCl_3$ and washed with 1 M HCl solution. The organic phase is concentrated and precipitated with acetone, filtered and dried to obtain the polymer. The synthetic yields are all higher than 80%.

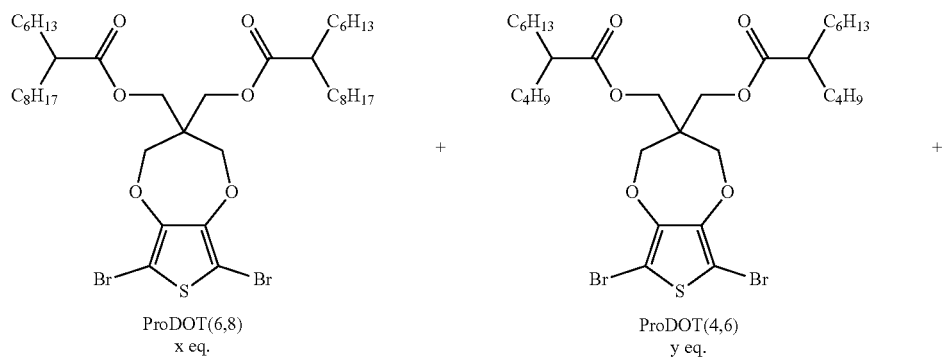

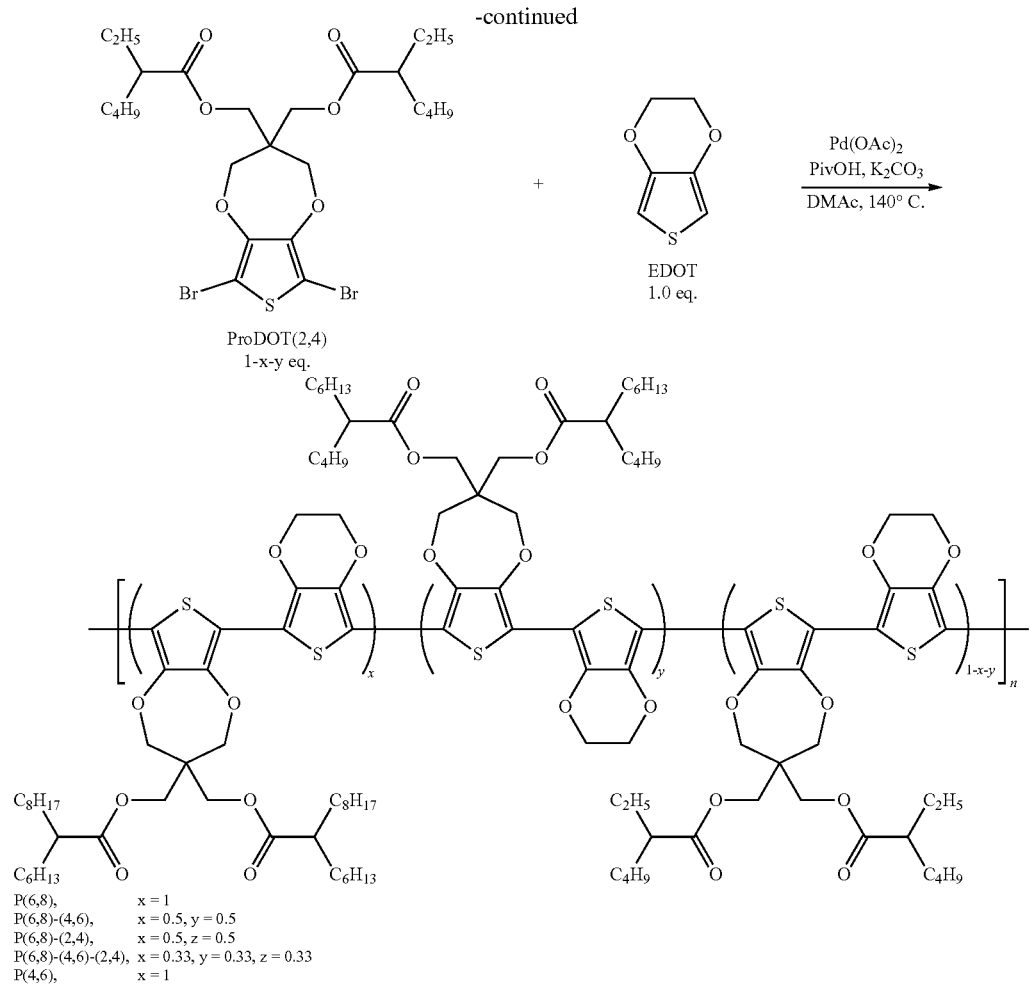

Figure 3:
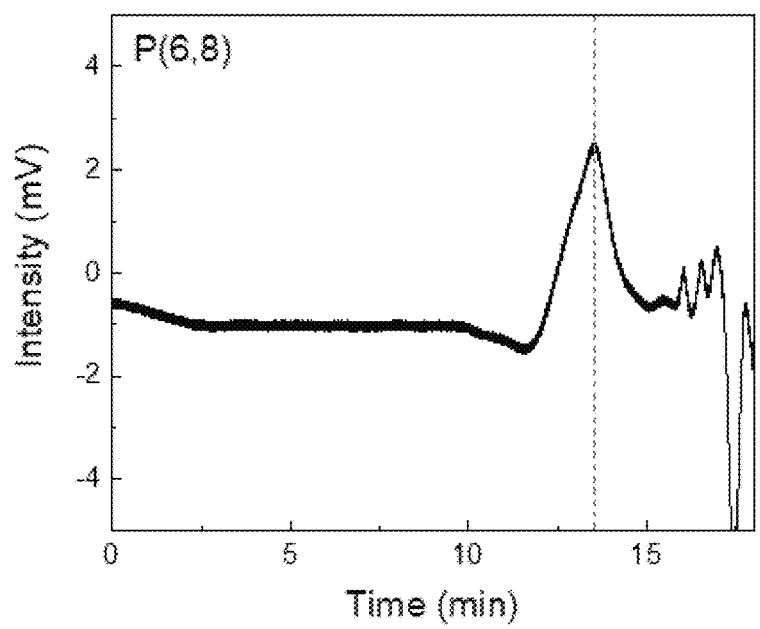
FIG. 3 is the Gel Permeation Chromatography (GPC) figure for an exemplary embodiment, $P_{(6,8)}$.
Figure 4:
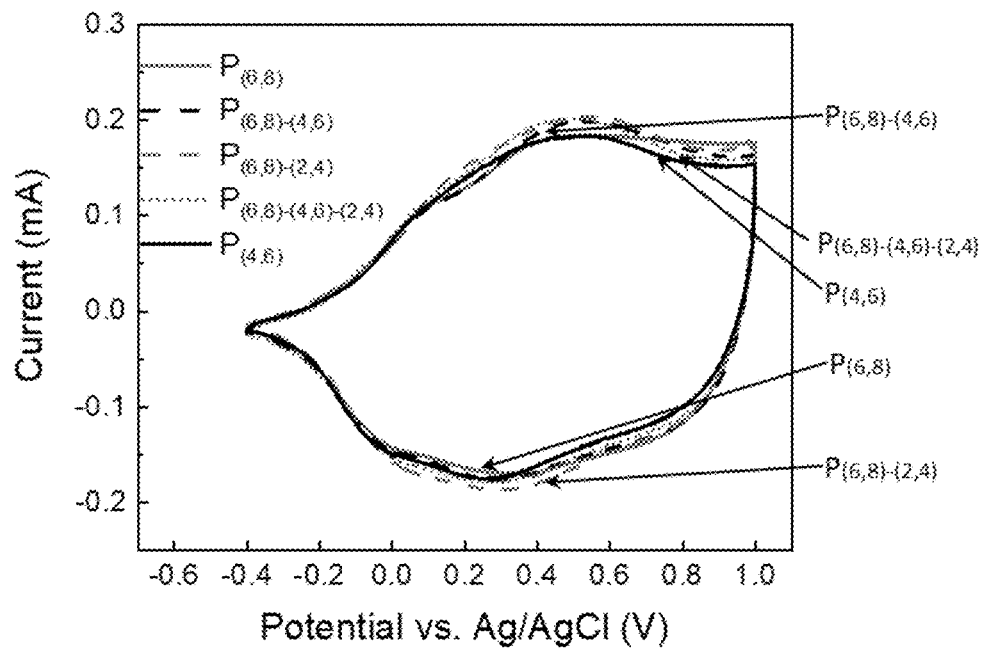
FIG. 4 is the CV curves of the example disclosed electrochromic polymers according to the embodiments of the invention.

Scheme 1. Direct Heteroarylation Polymerization for the Synthesis of Polythiophenes The polymer structures are confirmed by NMR (see FIGS. 2(A)-(E)). Per Gel Permeation Chromatography (GPC), all polymers show Mw around 20 kDa with PDI in the range of 1.5-2.0 (P(6,8) as an example shown in FIG. 3). Although the different alkyl side chains are used among the polymers, similar oxidation behaviors are observed for all the polymer thin films, as shown in FIG. 4.

Figure 5:
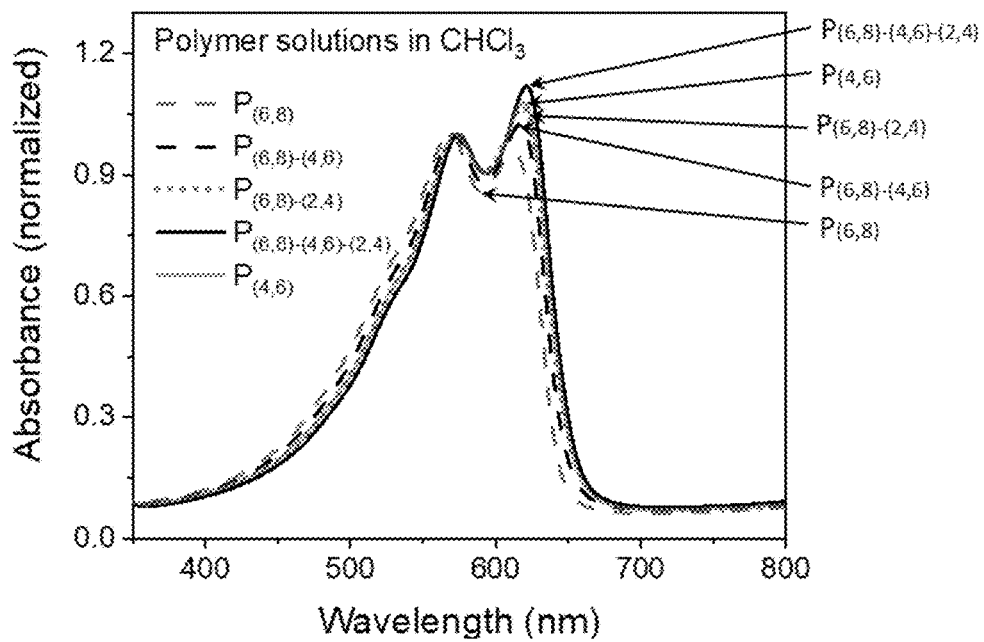
FIGS. 5(A)-(B) are the normalized absorbance spectra of the example disclosed electrochromic polymers according to the embodiments of the invention.
Figure 5B:
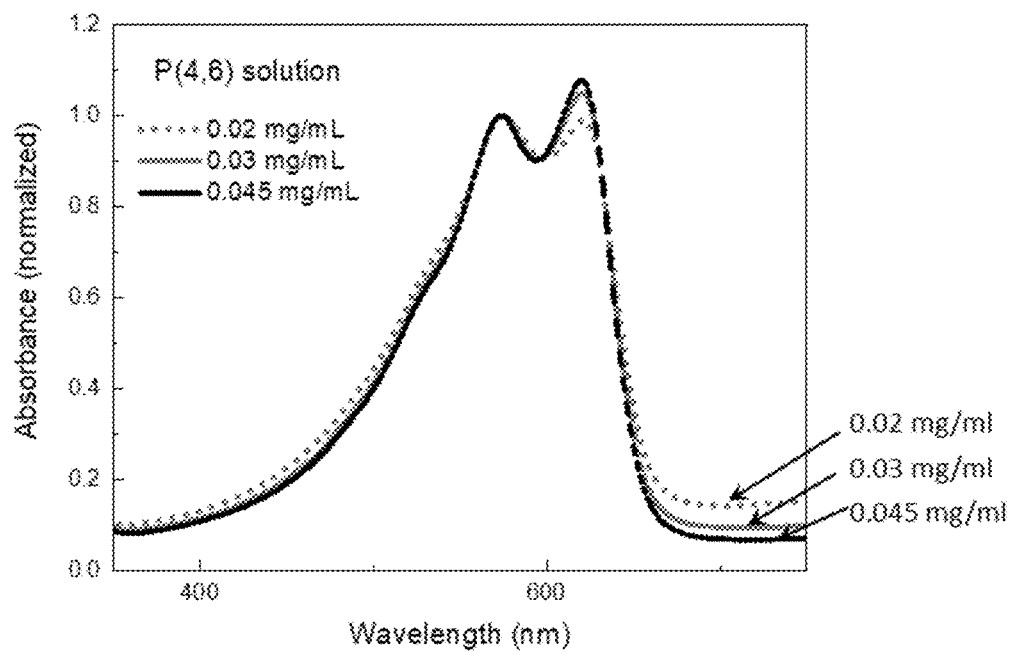

The absorbance spectra for all the polymer solutions (FIG. 5(A)) show two distinct peaks around 570 nm and 615 nm, and a slight shoulder peak around 525 nm. When normalizing the spectra by the corresponding peaks at 570 nm for each polymer, differences in the low energy peaks around 615 nm (position, onset and height) become evident. As the side chain density is decreased, the low energy peak position and onset become more red-shifted and its relative height increases, which might suggest higher backbone planarity and restricted conformational freedom for short alkyl-ester side chain polymers (low side chain densities), even in solution state. It is also observed that the relative height of the low energy absorbance peak increases with solution concentrations for all polymers, indicating the higher tendency of these polymers to aggregate in solution with increasing concentrations. Take P(4,6) as an example shown in FIG. 5(B), with only three representative concentrations are displayed. This tendency to aggregate with low side chain density aligns well with the solubility trend (the lower side chain density, the lower solubility). P(6,8) and P(6,8)-(4,6) show good solubility exceeding 40 mg/mL in chloroform, while the three polymers with the lowest side chain density reach their maximum solubility at this concentration. However, the stock solutions (40 mg/mL) are sufficient to prepare thin films with optical transmittance below 1% at the wavelength of maximum absorbance. Therefore, the solubility of these polymers does not limit the transmittance range of the spin-coated thin films and does not affect the solution processability to produce uniform films that have very low transmittance for all polymers.

Figure 6A:
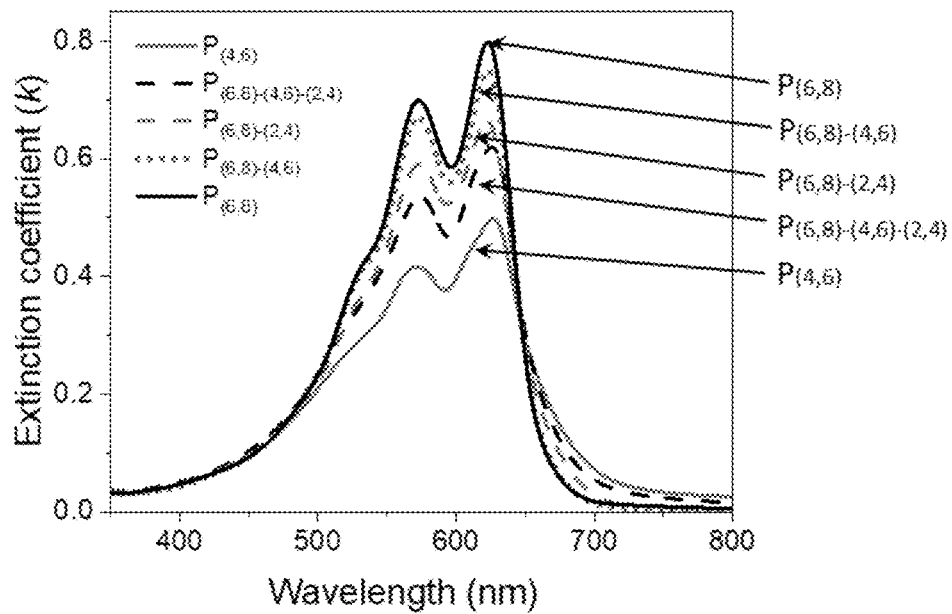
FIG. 6 (A) is the extinction coefficient (k) of the example disclosed polymer films according to the embodiments of the invention.
FIG. 6(B) is the calculated absorption coefficients (α) from the derived k values of the example disclosed polymer films according to the embodiments of the invention.
FIG. 6(C) is the Beer-Lambert plots of the example disclosed polymer as-cast films according to the embodiments of the invention.
Figure 6B:
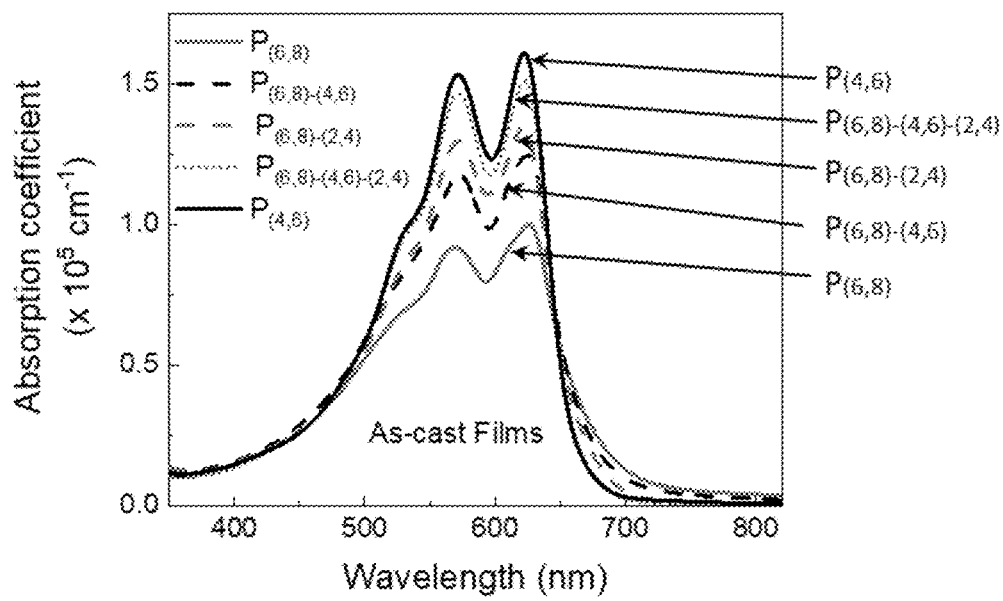
Figure 6C:
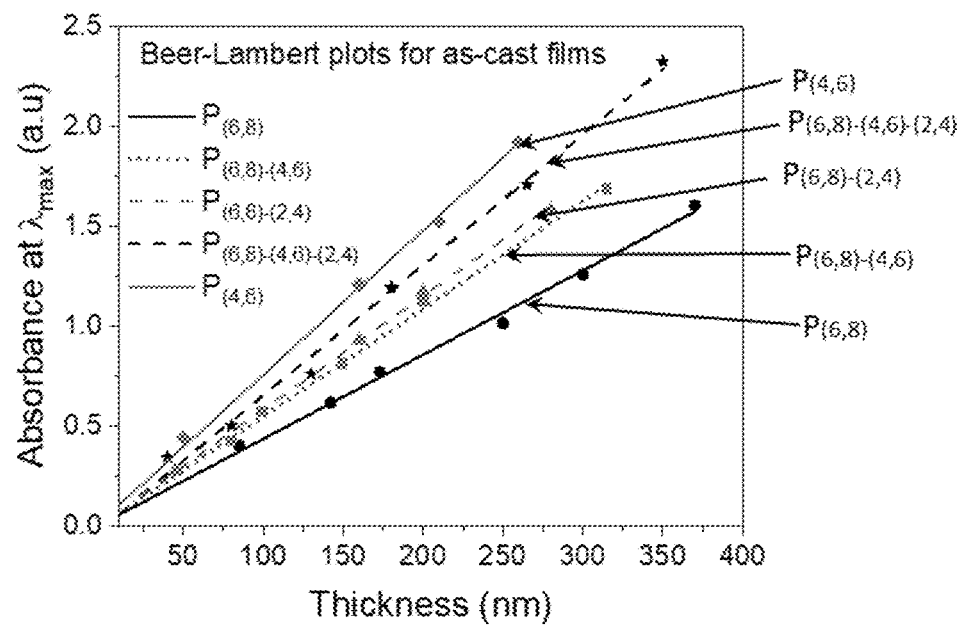

Absorption coefficient represents the amount of light absorbed by a film of unit thickness. To calculate the absorption coefficients of the films, two methods are adopted. First, method 1 by spectral reflectance is used. The extinction coefficient (k)) of the films are derived by fitting the transmittance and reflectance spectra measured by Filmetrics, and then the absorption coefficients ($\alpha$) over the visible region are calculated from the derived k values based on the formula of $\alpha = 4*\pi k/\text{wavelength}$. Method 2 by Beer-Lambert plots is also used. $\alpha$ values are obtained from the slope of Beer-Lambert plots (absorbance vs film thickness) multiplied with a factor of 2.303 and the films are either not applied any voltage (as-cast film) or maintained at either −0.5 V (colored film) or +1.0 V (bleached film) for data collection. For the bleached state, a swelling factor of 25% is assumed based on the results from both nanoindentation experiments and films thicknesses calculation by optical modeling using WVASE software. Thickness difference between as-cast films and electrochemically-conditioned colored films were assumed to be negligible. Take as-cast films as an example, extinction coefficient (k)) plots are shown in FIG. 6(A), and the calculated absorption coefficients by method 1 are shown in FIG. 6(B). The Beer-Lambert plots of absorbance vs film thickness are shown in FIG. 6(C). All the calculated absorption coefficients for as-cast films, electrochemically conditioned colored films and bleached films are listed in Table 1. As shown in Table 1, absorption coefficient values generated by two methods are quite comparable for all types of films.

As shown in Table 1, for as-cast and electrochemically conditioned colored films, polymers with lower side chain densities, are found to have high absorption coefficients. For example, for as-cast films, the $\alpha$ value increases from $1.0 \times 10^5$ cm$^{-1}$ (P(6,8)) to $1.6 \times 10^5$ cm$^{-1}$ (P(4,6)) at $\lambda_{max}$ when the $C_6C_8$ side chain is substituted by the shorter $C_4C_6$. When only half of the long alkyl side chains are replaced with shorter analogues, as in P(6,8)-(4,6) and P(6,8)-(2,4), the absorption coefficients are improved to 1.2 and $1.3 \times 10^5$ cm$^{-1}$ respectively. It is interesting to note the differences in absorption coefficients for the three polymers having the same low side chain density, where the $\alpha$ values increase in the order of PE(6,8)(2,4)<PE(6,8)-(4,6)-(2,4)<PE(4,6). It indicates that the absorption coefficient can be further improved by lowering the relative proportion of the long alkyl group even with the same side chain density design. This might be because the long alkyl chain may induce backbone torsion to some degree and reduce the persistence length, thus negatively impacts the absorption coefficient. Subsequent absorption coefficient calculations of electrochemically conditioned films in the colored state revealed the same trend as the one observed for as-cast films. The average absorption coefficients from two methods for electrochemically conditioned P(6,8) and P(4,6) colored films are $1.0 \times 10^5$ cm$^{-1}$ and $1.5 \times 10^5$ cm$^{-1}$ respectively.

Interestingly, for bleached films (or call electrochemically oxidized films), all polymers showed low extinction coefficients (k<0.1) over the visible region, with $\alpha_B$ values close to $1.0 \times 10^4$ cm$^{-1}$, amounting to at least a 10-fold reduction in the absorption coefficient when the polymers change from a colored to bleached state. Surprisingly, for bleached films, the lower side chain density the polymer has, the lower absorption coefficient the polymer has or the side chain density has minimum influence to the absorption coefficient in bleached state.

It can be concluded that the absorption coefficient in the colored (neutral) state can be increased by lowering the volume fraction of the solubilizing groups, without compromising the transmissivity of the bleached state.

Figure 7A:
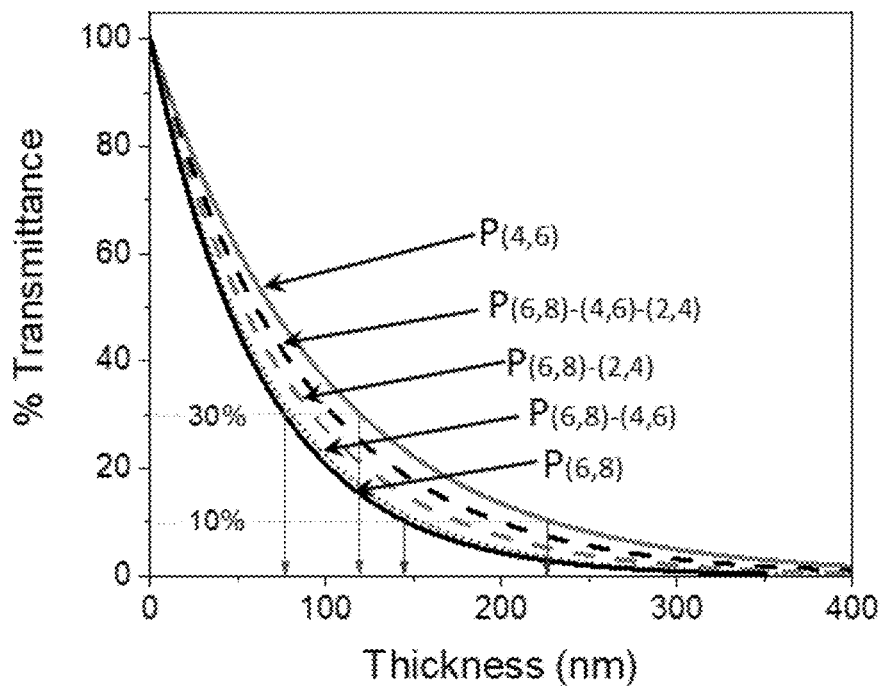
FIGS. 7(A)-(B) show the relationship between % transmittance and film thickness of the example disclosed polymer films according to the embodiments of the invention.
Figure 7B:
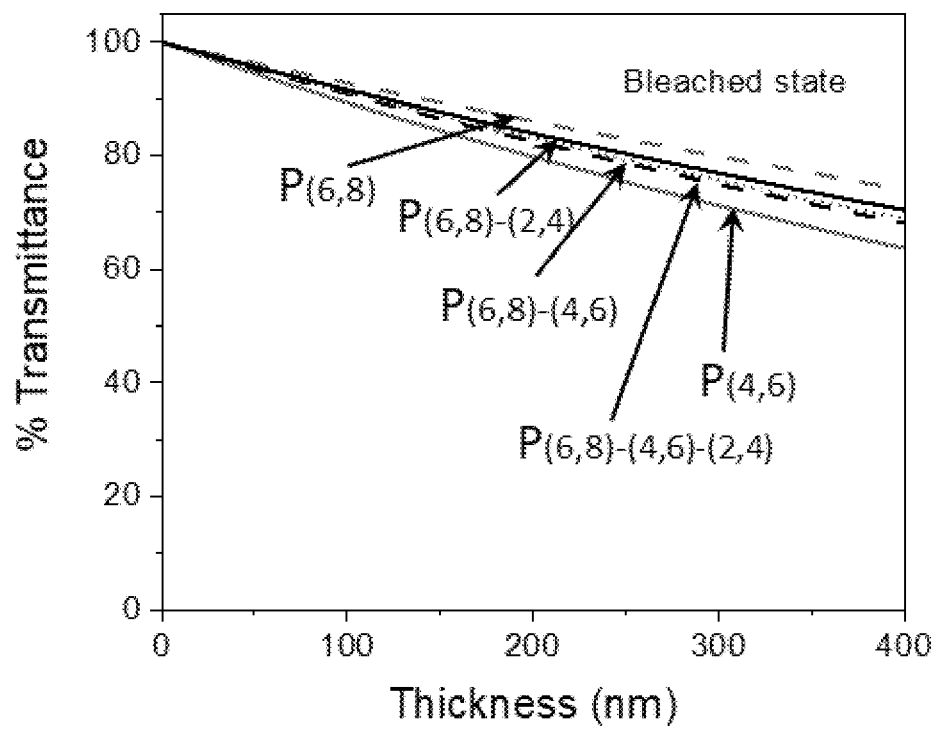

Absorption coefficient changes induced by varying the polymer side chain densities can translate into significant differences in electrochromic performance. According to Beer's Law, transmittance decays exponentially with thickness and the extent of decay is determined by the respective absorption coefficient. Therefore, as the absorption coefficient is increased, the film thickness required to achieve a specific transmittance decreases exponentially. As illustrated in FIGS. 7(A)-(B), there is approximately a 40 nm difference between the thickness of P(6,8) and P(4,6) films required to achieve the same transmittance level of 30% in the colored state, while this thickness difference increases to about 80 nm at the 10% transmittance level. Although exponentially related, transmittance of the bleached state appears linear in the thickness regime of interest. Since the bleached state absorption coefficient ($\alpha_B$) is approximately an order of magnitude smaller than the colored state absorption coefficient ($\alpha_C$), the optical contrast of thinner films is mostly influenced by $\alpha_C$, while the optical contrast of thicker films are limited by $\alpha_B$.

Figure 8:
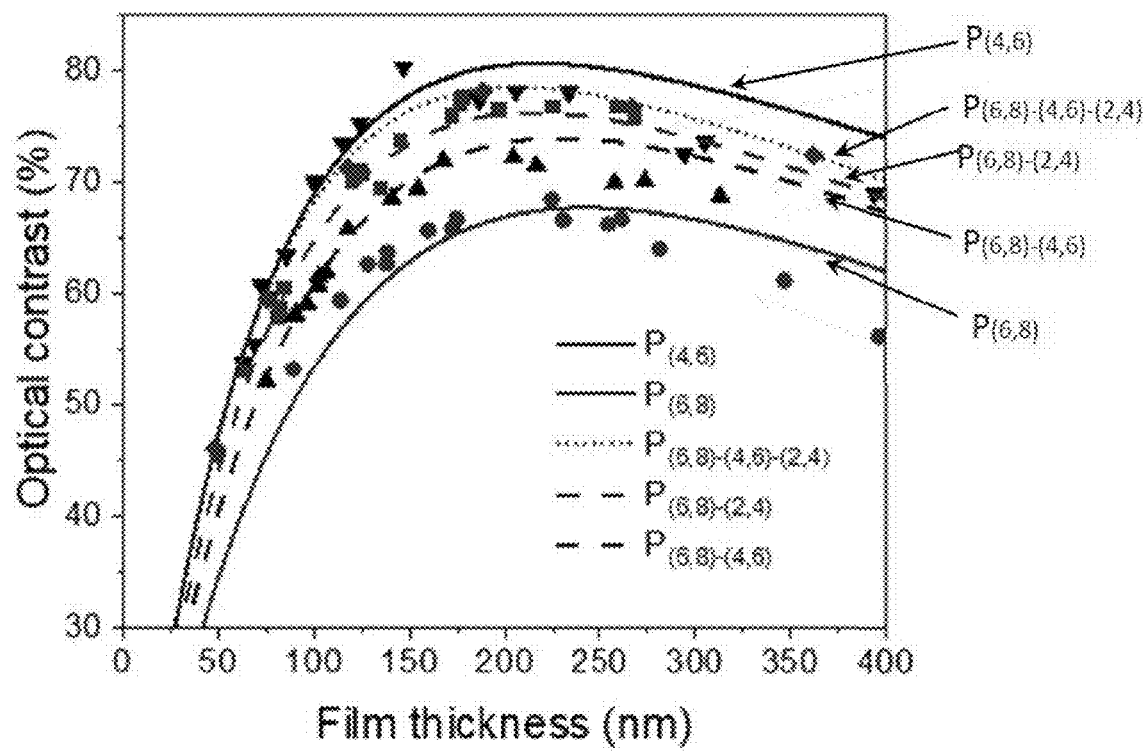
FIG. 8 is the comparison of the calculated optical contrast functions (lines) with the experimentally measured optical contrast values (dots) at different thicknesses for the example disclosed polymer films.

The relationship between optical contrast and film thickness is further investigated by both calculated optical contracts and experimentally measured optical contracts. As shown in FIG. 8, the various dots are the experimentally measured at various thicknesses through stepwise potential fast chronoamperometry (SPFC) by applying reducing and oxidizing potentials, −0.4 V and +1.0 V (+1.2 V for P1) respectively, for 30 s each and recording the transmittance changes in-situ at 550 nm and the respective $\lambda_{max}$ of the polymer. The various lines represent the predicted optical contrast functions at various thicknesses calculated from the absorption coefficients derived from spectral reflectance measurements. As shown in FIG. 8, a comparison of the calculated optical contrast functions and the experimentally obtained values for the five ProDOT-EDOT polymers demonstrates that experimental data match quite well with the predicted data and both the maximum optical contrast and the optical contrast achievable at a fixed thickness is higher for polymers with lower side chain density. Moving from P(6,8) to P(4,6), the maximum optical contrast at $\lambda_{max}$ can

TABLE 1

Comparison of absorption coefficients obtained for as-cast, electrochemically conditioned colored and bleached films using two different methods

| Polymer | As-cast films (x $10^5$ cm$^{-1}$) $\alpha C$ | | | Conditioned films (x $10^5$ cm$^{-1}$) $\alpha C$ | | | Bleached films (x $10^5$ cm$^{-1}$) $\alpha B$ | | |
|---|---|---|---|---|---|---|---|---|---|
| | Spectral Reflectance | Beer-Lambert | Average | Spectral Reflectance | Beer-Lambert | Average | Spectral Reflectance | Beer-Lambert | Average |
| P(6,8) | 1.0 | 0.95 | 0.98 | 1.02 | 0.91 | 0.97 | 0.11 | 0.10 | 0.11 |
| P(6,8)-(4,6) | 1.2 | 1.22 | 1.21 | 1.15 | 1.13 | 1.14 | 0.096 | 0.09 | 0.09 |
| P(6,8)-(2,4) | 1.3 | 1.30 | 1.30 | 1.33 | 1.23 | 1.28 | 0.093 | 0.07 | 0.08 |
| P(6,8-)(4,6)-(2,4) | 1.5 | 1.50 | 1.50 | 1.45 | 1.49 | 1.47 | 0.088 | 0.07 | 0.08 |
| P(4,6) | 1.6 | 1.61 | 1.61 | 1.43 | 1.57 | 1.5 | 0.075 | 0.08 | 0.08 | be improved from 68% to 80%. It is also interesting that the thickness required to achieve its maximum optical contrast is reduced when the side chain density gets lower. This is because, as the absorption coefficient is increased, optical density saturation is reached for much thinner films and the effect of residual absorbance in the bleached state takes over.

The relationship between thickness and optical contrast can be used to predict the maximum optical contrast with an optimized thickness. The expected maximum optical contrast and its corresponding optimized film thicknesses calculated based on the measured absorption coefficients are listed in Table 2 below.

TABLE 2

The maximum optical contrast % $\Delta T_{max}$ and its corresponding optimal thickness $t_{max}$ calculated using the absorption coefficients in the colored and bleached states

| Polymer | % $\Delta T_{max,\ predicted}$ | $t_{max,\ predicted}$ (nm) |
|---|---|---|
| P(6, 8) | 68 | 245 |
| P(6, 8)-(4, 6) | 73 | 235 |
| P(6, 8)-(2, 4) | 76 | 215 |
| P(6, 8)-(4, 6)-(2, 4) | 78 | 206 |
| P(4, 6) | 81 | 210 |

$$t_{max} = \frac{\ln\left(\frac{\alpha_C}{\alpha_B}\right)}{\alpha_C - \alpha_B}$$

$$\Delta\%\ T_{max} = 100(e^{-\alpha_B t_{max}} - e^{-\alpha_C t_{max}})$$

The benefits of thinner films from greater $\alpha_C$ are further exemplified in FIGS. 9(A)-(F). Three different colored state transmittance levels (~33%, ~18%, and ~5%) are compared among all five polymers, where the analyzed polymer film thicknesses range between 50-300 nm to avoid any anomalies that may arise due to the thickness being too low or too high. Significantly less film thickness is required for polymers with lower side chain density to achieve same colored state transmittance levels, especially in the case of lower colored state transmittance (FIGS. 9(D)-(F)). And these thinner films further lead to higher transmittance levels at the bleached state, resulting in a higher optical contrast for polymers with lower side chain density, even when their colored state transmittance levels are the same (FIGS. 9(A)-(C)). For example, when colored state transmittance level is around 33%, there are only a minimum difference (3-4%) in bleached state transmittance, and the optical contrasts of the five polymers are comparable. However, as the transmittance of the colored state is gradually lowered, optical contrast of polymers with high $\alpha_C$ remains high due to the ability to remain high transparency in the bleached state resulting from the minimized effect of residual color from thin film while the optical contrast of polymers with low ac is limited due to the limited transparency in the bleached state resulting from the interference of residual color from thicker film. When the colored state transmittance level is at around 5%, a difference of nearly 15% in the bleached state transmittance is observed. This means the polymers with lower side chain densities demonstrate more advantages in the applications with lowered color state transmittance level.

Figure 9A:
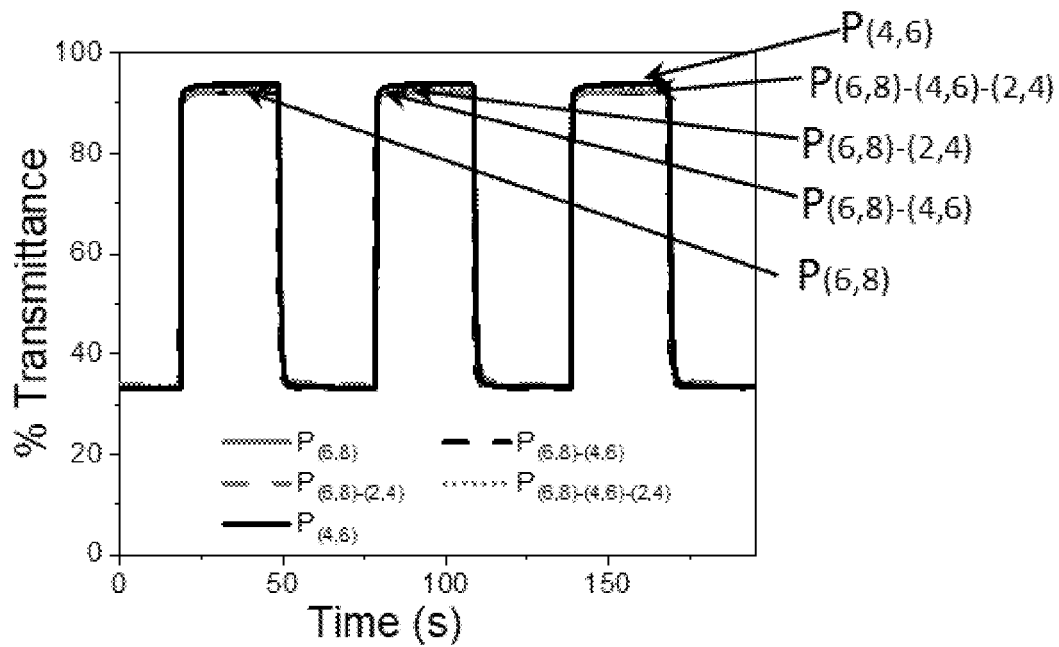
FIGS. 9(A)-(C) are the transmittance of the example disclosed polymer films according to the embodiments of the invention with same colored state transmittance.
Figure 9B:
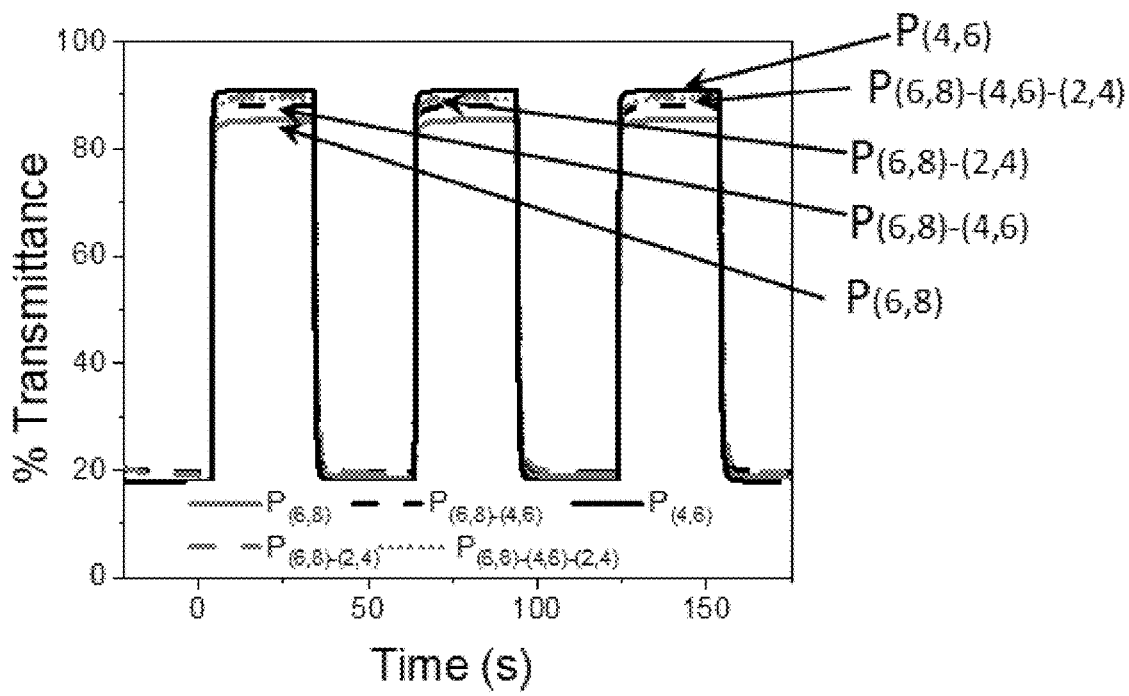
Figure 9C:
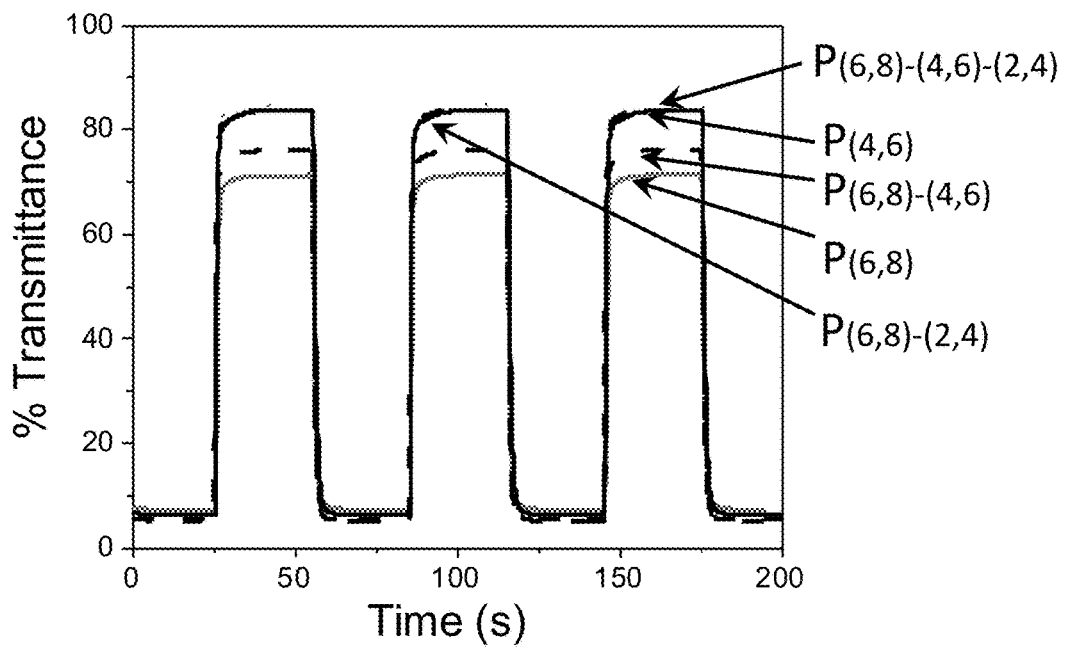
Figure 9D:
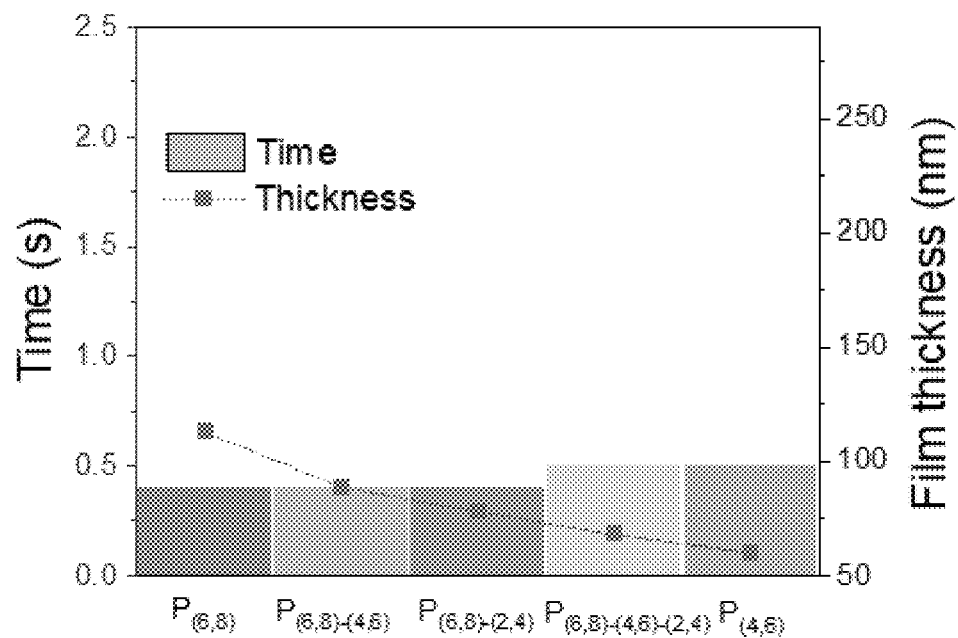
FIGS. 9(D)-(F) are the switching time of the polymer films according to the embodiments of the invention with same colored state transmittance.
Figure 9E:
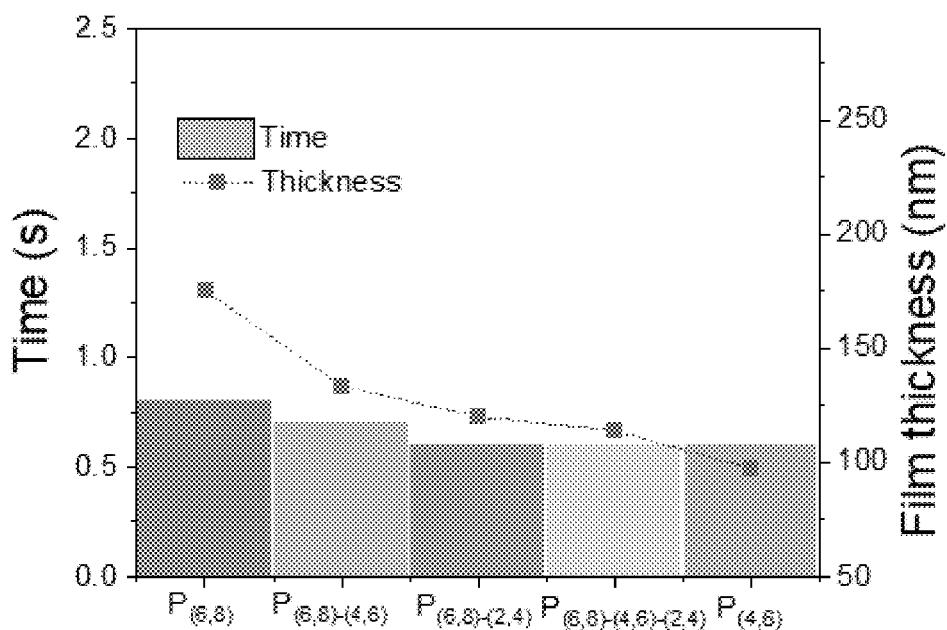
Figure 9F:
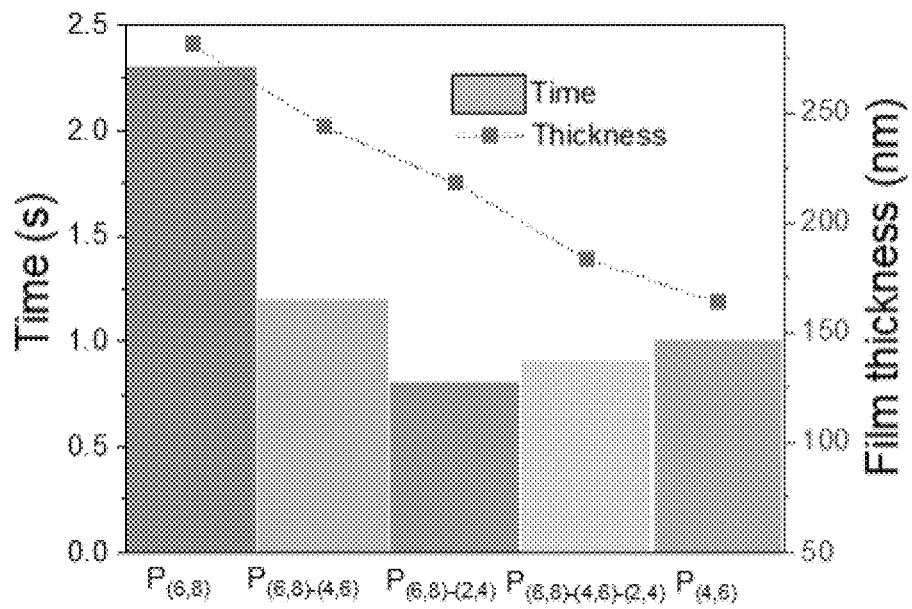

The thinner film endowed by lower side chain density not only benefits the optical contrast, but also benefits its switching kinetic, for example, switching time. Although the close packing of polymers with lower side chain density may limit ion diffusion and further negatively impact its switching kinetics, to achieve the same optical densities, the polymers with lower side chain density allow the use of thinner films, and the thinner films further improve switching kinetics. Therefore, as shown in FIGS. 9(D)-(F), using the thinner films, polymers with lower side chain density show comparable or even faster switching kinetics when compared to those with higher side chain density, especially at lower colored state transmittance levels.

Figure 10:
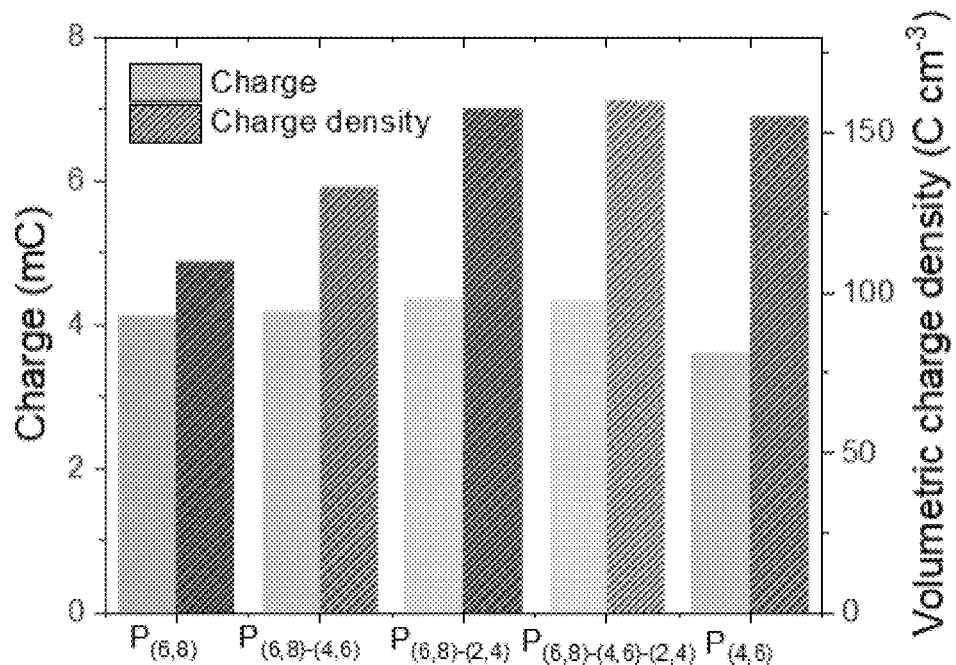
FIG. 10 is the total charge required for electrochemical oxidation of films with 18% transmittance in the colored state and the respective volumetric charge densities for the example disclosed polymer films of different thicknesses.

Furthermore, lower side chain density results in higher chromophore density, and leads to higher charge density, which may also lead to lower coloration coefficient when the polymers have the same film thickness. However, this negative effect can also be offset by the use of thinner films. As shown in FIG. 10, polymers with lower side chain density exhibit higher volumetric charge density. However, when using thinner films, the total charges required for the polymers with lower side chain densities to achieve the similar color changing are similar or even lower than the polymers with higher side chain density with thicker films, which indicates comparable or even better coloration efficiency when using thinner films.

The benefit of thinner film introduced by lower side chain density are summarized in Table 3. To achieve its corresponding maximum optical contrast, polymers with lower side chain densities can use thinner film thicknesses and achieve greater optical contrasts, higher coloration efficiency, and comparable switching time.

TABLE 3

Experimentally derived values for maximum optical contrast, switching time and coloration efficiency

| Polymer | % $\Delta T_{max,\ predicted}$ | $t_{max,\ predicted}$ (nm) |
|---|---|---|
| P(6, 8) | 68 | 245 |
| P(6, 8)-(4, 6) | 73 | 235 |
| P(6, 8)-(2, 4) | 76 | 215 |
| P(6, 8)-(4, 6)-(2, 4) | 78 | 206 |
| P(4, 6) | 81 | 210 |

In another aspect, the present disclosure is also related to an electrochromic device incorporating the disclosed ECPs.

What is claimed is:

1. An electrochromic polymer, comprising a formula of

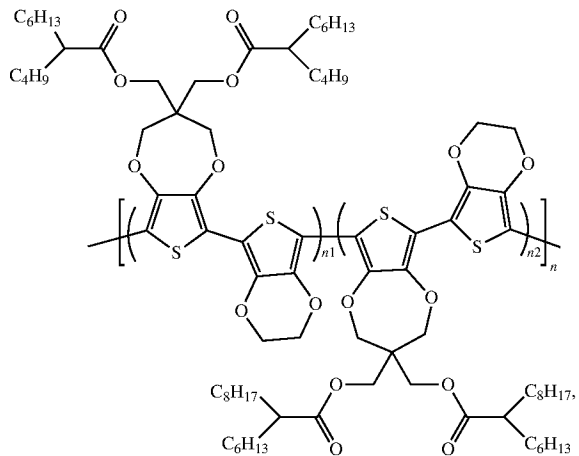

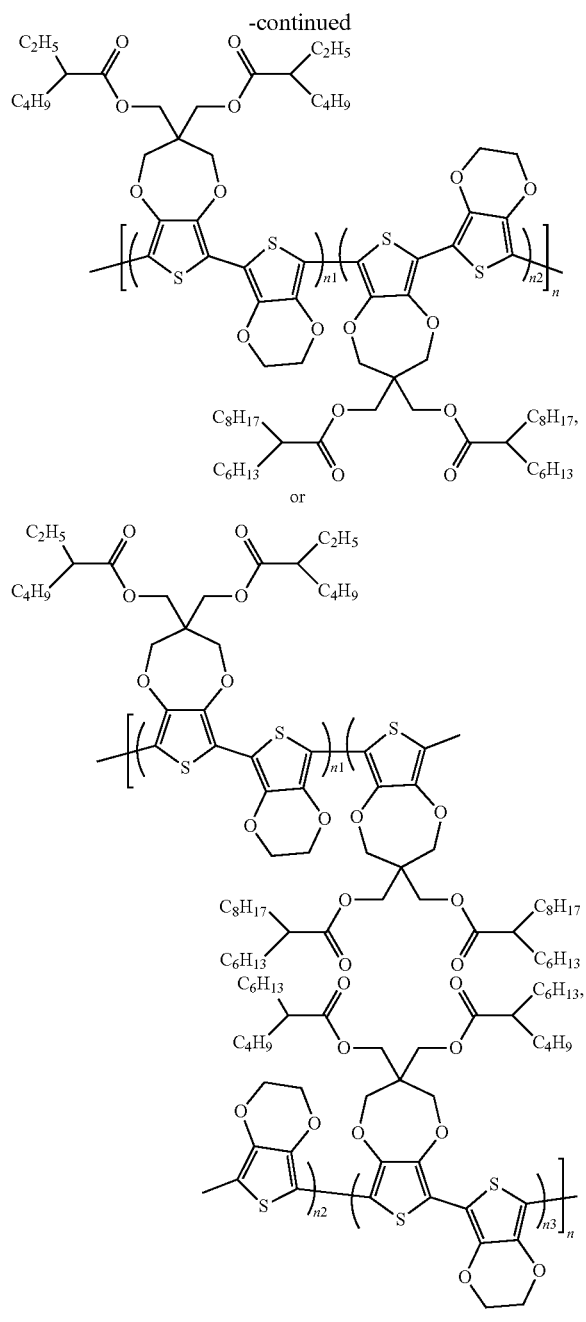

wherein n is an integer greater than 0;

$n_1$, $n_2$, and $n_3$ are no less than 0, and a sum of $n_1$, $n_2$, and $n_3$ equals 1; and the electrochromic polymer has a side chain density calculated by a total mass percentage of side chains with respect to a mass of the electrochromic polymer.

2. The electrochromic polymer of claim 1, wherein the side chain density ranges from 35% to 60%.

3. The electrochromic polymer of claim 1, wherein a maximum optical contrast of the electrochromic polymer is dependent on the side chain density.

4. The electrochromic polymer of claim 3, wherein the maximum optical contrast of the electrochromic polymer increases with a reduced side chain density, and the maximum optical contract ranges from 60% to 95%.

5. The electrochromic polymer of claim 1, wherein an absorption coefficient in a bleached state of the electrochromic polymer is dependent on the side chain density.

6. The electrochromic polymer of claim 5, wherein the absorption coefficient in the bleached state decreases with a reduced side chain density of the electrochromic polymer.

7. The electrochromic polymer of claim 5, wherein the absorption coefficient in the bleached state of the electrochromic polymer decreases within 35% when the side chain density decreases from 60% to 35%.

8. The electrochromic polymer of claim 5, wherein the absorption coefficient in the bleached state of the electrochromic polymer varies from $0.04 \times 10^5$ to $0.13 \times 10^5$ cm$^{-1}$.

9. The electrochromic polymer of claim 1, wherein an absorption coefficient in a colored state of the electrochromic polymer is dependent on the side chain density.

10. The electrochromic polymer of claim 9, wherein the absorption coefficient in the colored state increases with a reduced side chain density.

11. The electrochromic polymer of claim 9, wherein the absorption coefficient in the colored state of the polymer varies from about $0.7 \times 10^5$ cm$^{-1}$ to $1.8 \times 10^5$ cm$^{-1}$.

12. A device incorporating the electrochromic polymer of the claim 1.

* * * * *